(12) United States Patent
Roth

(10) Patent No.: US 7,515,536 B2
(45) Date of Patent: Apr. 7, 2009

(54) TRANSPARENT TRANSPORT OF FIBRE CHANNEL TRAFFIC OVER PACKET-SWITCHED NETWORKS

(75) Inventor: Moran Roth, Tel-Aviv (IL)

(73) Assignee: Corrigent Systems Ltd., Tel Aviv (IL)

( * ) Notice: Subject to any disclaimer, the term of this patent is extended or adjusted under 35 U.S.C. 154(b) by 129 days.

(21) Appl. No.: 11/479,595

(22) Filed: Jun. 29, 2006

(65) Prior Publication Data

US 2007/0011318 A1 Jan. 11, 2007

Related U.S. Application Data

(60) Provisional application No. 60/698,538, filed on Jul. 11, 2005.

(51) Int. Cl.
| H04L 12/26 | (2006.01) |
| H04L 12/28 | (2006.01) |
| H04J 3/18  | (2006.01) |

(52) U.S. Cl. .................. 370/230; 370/391; 370/477

(58) Field of Classification Search ............... 370/229, 370/230, 232, 235, 236, 391, 400, 401, 464–467, 370/477
See application file for complete search history.

(56) References Cited

U.S. PATENT DOCUMENTS

| 5,303,234 | A  | * | 4/1994  | Kou .................. 370/442 |
| 5,600,316 | A  | * | 2/1997  | Moll .................. 341/87 |
| 6,275,493 | B1 |   | 8/2001  | Morris et al. |
| 6,381,215 | B1 | * | 4/2002  | Hamilton et al. ......... 370/236 |
| 6,408,001 | B1 |   | 6/2002  | Chuah et al. |
| 6,507,577 | B1 |   | 1/2003  | Mauger et al. |
| 6,522,627 | B1 |   | 2/2003  | Mauger et al. |
| 6,563,793 | B1 |   | 5/2003  | Golden et al. |
| 6,604,136 | B1 |   | 8/2003  | Chang et al. |
| 6,633,566 | B1 |   | 10/2003 | Pierson, Jr. |
| 6,760,775 | B1 |   | 7/2004  | Anerousis et al. |
| 6,778,494 | B1 |   | 8/2004  | Mauger et al. |
| 6,778,496 | B1 |   | 8/2004  | Meempat et al. |
| 6,831,932 | B1 |   | 12/2004 | Boyle et al. |
| 6,886,043 | B1 |   | 4/2005  | Mauger et al. |
| 6,925,054 | B1 |   | 8/2005  | Atterton et al. |
| 6,985,447 | B2 |   | 1/2006  | Gibson et al. |
| 7,079,544 | B2 |   | 7/2006  | Wakayama et al. |
| 2001/0033575 | A1 |   | 10/2001 | Shimamura et al. |
| 2001/0047460 | A1 | * | 11/2001 | Kobayashi et al. .......... 711/162 |
| 2002/0015411 | A1 |   | 2/2002  | Kataoka et al. |
| 2002/0018482 | A1 |   | 2/2002  | Gotzer |

(Continued)

OTHER PUBLICATIONS

U.S. Appl. No. 60/698,538.

(Continued)

Primary Examiner—Hong Cho
(74) Attorney, Agent, or Firm—Darby & Darby P.C.

(57) ABSTRACT

A method for transporting fibre channel (FC) traffic over a packet-switched communication network includes identifying a sub-sequence of repetitive FC signals in a first sequence of FC words accepted over a FC link from a source FC device. The first sequence of FC words is translated into a second sequence of data packets in accordance with a communication protocol supported by the packet-switched communication network. The second sequence includes a repetition indication packet that identifies the sub-sequence of repetitive FC signals. The second sequence of the data packets is transported to a receiver over the packet-switched communication network using the communication protocol.

15 Claims, 5 Drawing Sheets

U.S. PATENT DOCUMENTS

| | | | |
|---|---|---|---|
| 2002/0085548 | A1 | 7/2002 | Ku et al. |
| 2002/0093949 | A1 | 7/2002 | Yasue et al. |
| 2002/0176450 | A1 | 11/2002 | Kong et al. |
| 2003/0026298 | A1 | 2/2003 | Bisson et al. |
| 2003/0043826 | A1* | 3/2003 | Charzinski et al. ......... 370/405 |
| 2003/0061338 | A1 | 3/2003 | Stelliga |
| 2003/0137937 | A1* | 7/2003 | Tsukishima et al. ........ 370/230 |
| 2004/0008702 | A1* | 1/2004 | Someya et al. ............. 370/401 |
| 2004/0101303 | A1 | 5/2004 | Williams |
| 2004/0202157 | A1 | 10/2004 | Chase et al. |
| 2005/0135436 | A1 | 6/2005 | Nigam et al. |

OTHER PUBLICATIONS

Braden, R., et al. Resource Reservation Protocol (RVSP), RFC 2205, Sep. 1997, p. 1-99.

Awduche, D., et al. "RSVP-TE: Extensions to RSVP for LSP Tunnels." RFC 3209, Dec. 2001, p. 1-54.

Rosen, E., et al. "Multiprotocol Label Switching Architecture." RFC 3031, Jan. 2001, p. 1-54.

Rajagopal, M., et al. "Fibre Channel Over TCP/IP (FCIP)." RFC 3821, Jul. 2004, p. 1-68.

The Fibre Channel Backbone 3 (FC-BB-3) draft, Version 7.0, published by task group T11.3 of the INCITS, Jan. 17, 2006, p. 1-169.

* cited by examiner

TRANSPARENT TRANSPORT OF FIBRE CHANNEL TRAFFIC OVER PACKET-SWITCHED NETWORKS

CROSS-REFERENCE TO RELATED APPLICATIONS

This application claims the benefit of U.S. Provisional Patent Application Ser. No. 60/698,538, filed Jul. 11, 2005, which is incorporated herein by reference.

FIELD OF THE INVENTION

The present invention relates generally to communication systems, and particularly to methods and systems for transporting fibre channel (FC) traffic over packet-switched communication networks.

BACKGROUND OF THE INVENTION

Fibre channel (FC) is a high-speed serial interconnection interface, which is used in various storage and networking applications. FC has been standardized by working group T11 of the International Committee for Information Technology Standards (INCITS). FC standards are available at www.t11.org.

Some FC standards and drafts define the transport of FC traffic over different backbone networks. For example, the Fibre Channel Backbone 3 (FC-BB-3) draft, version 7.0, published by task group T11.3 of the INCITS, Jan. 17, 2006, which is incorporated herein by reference, defines the functions and mappings necessary to tunnel fibre channel links, or bridge fibre channel networks, across wide area networks (WAN). This document describes mapping models of FC to Asynchronous Transfer Mode (ATM), Synchronous Optical Network (SONET), Transmission Control Protocol/Internet Protocol (TCP/IP) and Transparent Generic Framing Procedure (GFP-T).

Methods for carrying FC traffic over IP networks are also described by Rajagopal et al. in an Internet Engineering Task Force (IETF) Request for Comments (RFC) 3821, entitled "Fibre Channel over TCP/IP (FCIP)," July, 2004, which is incorporated herein by reference. The FCIP mechanisms allow the interconnection of islands of FC storage area networks over IP-based networks to form a .unified storage area network in a single FC fabric. This RFC, as well as other IETF RFCs cited hereinbelow, is available at www.ietf.org/rfc.

SUMMARY OF THE INVENTION

Embodiments of the present invention provide improved methods and systems for transporting fibre channel (FC) traffic over packet-switched networks. FC translators located at the edge of a packet-switched network perform transparent transport of FC traffic between source and destination FC devices.

An ingress FC translator accepts a sequence of FC words, typically comprising FC data frames and ordered sets, from the source FC device. The FC words are translated into packets of a communication protocol used by the packet-switched network, such as the multiprotocol label switching (MPLS) protocol. Typically, the translation comprises encapsulating the FC data frames and/or ordered sets in data packets of the communication protocol. The packets are transported over the packet-switched network, and the sequence of FC words is reproduced from the transported packets by an egress FC translator connected to the destination FC device.

In order to reduce the traffic sent over the packet-switched network, the ingress FC translator identifies in the sequence of FC words repetitive signals, such as primitive sequences and IDLE sequences. The ingress FC translator refrains from sending the repetitive signals over the packet-switched network, and instead sends a repetition indication packet identifying the repetitive signal. The egress FC translator re-generates the repetitive signal sequence responsively to the repetition indication packet, thus providing legitimate FC traffic sequence to the destination FC device without sending superfluous data over the packet-switched network.

In some embodiments, the communication path used for transporting the packets between the ingress and egress FC translators has a certain packet loss probability. For example, statistical multiplexing may be used when allocating bandwidth to the communication path, to increase the efficiency of use of network resources. In these embodiments, the ingress and egress FC translators selectively retransmit lost packets. Additionally or alternatively, the ingress FC translator may adaptively adjust the packet transmission rate based on the packet loss performance of the communication path.

Thus, the methods and systems described herein enable reliable, efficient and transparent transport of FC traffic over packet-switched networks. Additionally, since only a single, non-terminated FC link is defined between the source and destination FC devices, the methods and systems described herein enable logical and operational separation between the FC domain and the packet domain, which are often operated by different organizations.

There is therefore provided, in accordance with an embodiment of the present invention, a method for transporting fibre channel (FC) traffic over a packet-switched communication network, the method including:

identifying a sub-sequence of repetitive FC signals in a first sequence of FC words accepted over a FC link from a source FC device;

translating the first sequence of FC words into a second sequence of data packets in accordance with a communication protocol supported by the packet-switched communication network, the second sequence including a repetition indication packet that identifies the sub-sequence of repetitive FC signals;

transporting the second sequence of the data packets to a receiver over the packet-switched communication network using the communication protocol.

The method may further include receiving the transported data packets from the packet-switched communication network, reproducing the first sequence of the FC words by re-generating the sub-sequence of repetitive FC signals responsively to the repetition indication packet, and providing the reproduced FC words to a destination FC device.

In an embodiment, receiving the transported data packets includes identifying a lost data packet, and transporting the second sequence includes retransmitting the lost data packet. Additionally or alternatively, receiving the transported data packets includes monitoring a packet loss performance of the transported data packets, and transporting the second sequence includes adjusting a transmission rate of the data packets responsively to the monitored packet loss performance.

In another embodiment, providing the reproduced FC words to the destination FC device includes providing data for storage in a remote storage device.

In yet another embodiment, the communication protocol includes a multiprotocol label switching (MPLS) protocol, and transporting the second sequence includes sending the data packets via an MPLS label switched path (LSP) established through the packet-switched communication network.

In still another embodiment, the first sequence includes FC data frames and ordered sets, and translating the first sequence into the second sequence includes encapsulating at least one of the FC data frames and the ordered sets in accordance with the communication protocol to produce the data packets.

In an embodiment, translating the first sequence into the second sequence includes sending the repetition indication packet while refraining from sending the sub-sequence of repetitive FC signals over the packet-switched communication network.

In another embodiment, the method includes establishing a FC connection between the source and destination FC devices via the packet-switched communication network that is not terminated between the source and destination FC devices by:

accepting login signaling from the source FC device for logging in with the destination FC device;

transporting the login signaling over the packet-switched communication network to the destination FC device;

receiving over the packet-switched communication network an FC address of the destination FC device in response to the-login signaling;

delivering the FC address to the source FC device; and transporting the FC words over the established connection by directing the FC words to the FC address.

In yet another embodiment, transporting the second sequence of data packets includes at least one of communicating with a shared resource, accessing shared content and communicating with a server in a server cluster.

There is additionally provided, in accordance with an embodiment of the present invention, a method for transporting fibre channel (FC) traffic over a packet-switched communication network, the method including:

accepting login signaling from a first FC device over a FC link for logging in with a second FC device;

transporting the login signaling over the packet-switched communication network to the second FC device;

in response to the login signaling, receiving over the packet-switched communication network an FC address of the second FC device;

delivering the FC address over the FC link to the first FC device so as to establish, via the packet-switched communication network, a FC connection between the first and second FC devices that is not terminated between the first and second FC devices;

accepting from the first FC device over the FC link a sequence of the FC words directed to the FC address; and transporting the FC words over the connection via the packet-switched communication network to the second FC device.

There is further provided, in accordance with an embodiment of the present invention, a system for transporting fibre channel (FC) traffic between source and destination FC devices over a packet-switched communication network, including:

a first translator, which is arranged to accept a first sequence of FC words from the source FC device, to identify a sub-sequence of repetitive FC signals in the first sequence of FC words, to translate the first sequence of FC words into a second sequence of data packets in accordance with a communication protocol supported by the packet-switched communication network, the second sequence including a repetition indication packet that identifies the sub-sequence of repetitive FC signals, and to transport the second sequence of the data packets over the packet-switched network -using the communication protocol; and a second translator, which is arranged to receive the transported data packets from the packet-switched communication network, to reproduce the first sequence of FC words by re-generating the sub-sequence of repetitive FC signals responsively to the repetition indication packet, and to provide the reproduced FC words to the destination FC device.

There is also provided, in accordance with an embodiment of the present invention, apparatus for transporting fibre channel (FC) traffic over a packet-switched communication network, including:

an input interface, which is arranged to exchange FC words with a first FC device over a FC link; and a translator, which is arranged to accept login signaling from a first FC device over the FC link for logging in with a second FC device, to transport the login signaling over the packet-switched communication network to the second FC device, to receive in response to the login signaling over the packet-switched communication network an FC address of the second FC device, to deliver the FC address over the FC link to the first FC device so as to establish, via the packet-switched communication network, a FC connection between the first and second FC devices that is not terminated between the first and second FC devices, to accept from the first FC device over the FC link a sequence of the FC words directed to the FC address, and to transport the FC words over the connection via the packet-switched communication network to the second FC device.

There is additionally provided, in accordance with an embodiment of the present invention, apparatus for transporting fibre channel (FC) traffic over a packet-switched communication network, including:

an input interface, which is arranged to accept a first sequence of FC words from a source FC device; and a translator, which is arranged to identify a sub-sequence of repetitive FC signals in the first sequence of FC words, to translate the first sequence of FC words into a second sequence of data packets in accordance with a communication protocol supported by the packet-switched communication network, the second sequence including a repetition indication packet that identifies the sub-sequence of repetitive FC signals, and to transport the second sequence of the data packets over the packet-switched network using the communication protocol to a receiver in order to provide the FC words to a destination FC device.

The present invention will be more fully understood from the following detailed description of the embodiments thereof, taken together with the drawings in which:

DETAILED DESCRIPTION OF EMBODIMENTS

Figure 1:
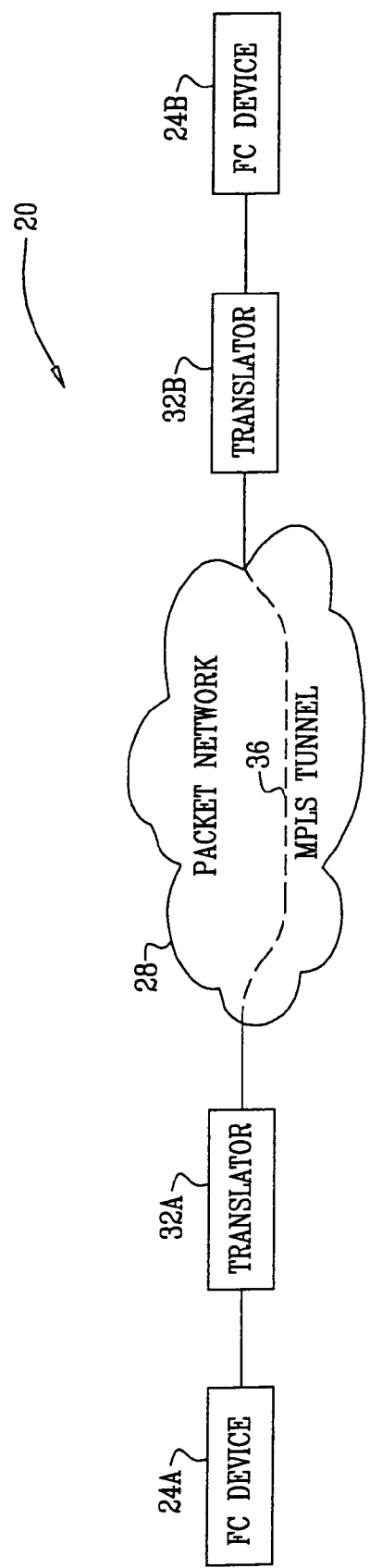
FIG. 1 is a block diagram that schematically illustrates a communication system, in accordance with an embodiment of the present invention.

FIG. 1 is a block diagram that schematically illustrates a communication system 20, in accordance with an embodiment of the present invention. System 20 comprises two or more fibre channel (FC) devices 24, which communicate with one another over a packet-switched network 28. For example, system 20 may be used in a remote storage application in which data produced at a primary computing site is sent for storage in a remote storage device. Alternatively, system 20 may comprise any other system or application that uses FC communication, such as mirroring of data in secondary backup sites and recovery of remotely-stored data.

FC devices 24 may comprise computing platforms, storage devices or any other device capable of communicating using FC traffic. Network 28 may comprise a wide area network (WAN) such as the Internet, a metropolitan area network (MAN), a local area network (LAN) or any other suitable packet-switched network. Typically, network 28 comprises an IP network. In the exemplary embodiment of FIG. 1, the network is configured for multiprotocol label switching (MPLS). MPLS is described by Rosen et al. in "Multiprotocol Label Switching Architecture" IETF RFC 3031, January, 2001, which is incorporated herein by reference.

The FC devices are connected to network 28 using FC translators 32, which are located at the edge of the packet-switched network. The translators perform transparent bidirectional translation of FC traffic into the communication protocol used by the packet network, the MPLS protocol in the present example. In FIG. 1, system 20 comprises two FC devices, denoted 24A and 24B. Two translators, denoted 32A and 32B, connect FC devices 24A and 24B, respectively, to the MPLS network. A label switched path (LSP) 36, also referred to as an MPLS tunnel, is established between translators 32A and 32B.

Translators 32 perform both ingress and egress processing of traffic. The term "ingress processing" refers to the process of accepting FC traffic from a source FC device connected locally to the translator, processing the traffic and sending it over network 28 to a remote destination FC device. The term "egress processing" refers to the process of accepting data packets originating from a remote (source FC device over network 28, reproducing the FC traffic and providing it to a destination FC device connected locally to the translator. A translator performing ingress processing is referred to as an ingress translator, and a translator performing egress processing is referred to as an egress translator. Typically, each translator 32 performs both ingress and egress processing simultaneously. Each FC device 24 typically acts as a source FC device for some FC frames, and as a destination FC device for others.

In principle, the ingress translator accepts a sequence of FC words from the source FC device. The sequence typically comprises FC data frames and ordered sets. (The term "ordered set" collectively refers to FC primitive signals and primitive sequences, as defined in the FC standard.) The ingress translator encapsulates the data frames and ordered sets in MPLS packets. The ingress translator then sends the MPLS packets via MPLS tunnel 36 to the destination translator. The destination translator decapsulates the MPLS packets, reproduces the encapsulated FC data frames and ordered sets, and provides the reproduced traffic to the destination FC device.

Unlike some known FC transport methods in which the FC link is terminated at the edge of the packet network, in the methods and systems described herein the translator is not defined as a FC entity, i.e., it does not have a FC address. The methods and systems described herein provide full logical and operational separation between the FC domain and the packet domain, which are often operated by different organizations. In a storage area network (SAN) application, for example, the SAN and the packet network can be managed as separate and independent administrative domains.

Moreover, the methods and systems described herein comprise mechanisms that reduce the bandwidth allocation in network 28 needed for transporting the FC traffic. FC traffic often includes repetitive data patterns and commands, referred to herein as repetitive signals. For example, when a FC link is idle, the source FC device periodically sends IDLE signals to the destination FC device. Sequences of IDLE signals are also transmitted in the inter-frame gaps (IFG) between successive FC frames. Additional examples of repetitive signals, i.e., periodic repetitive transmission of the same primitive at regular intervals, may comprise primitive sequences such as off-line (OLS), not operational (NOS), link reset (LR). and link reset response (LRR).

In order to reduce the amount of traffic sent over the packet network, the ingress translator identifies repetitive signals produced by the source FC device. The ingress translator suppresses the repetitive signals and refrains from sending them over network 28. Instead, the ingress translator sends only a repetition indication packet identifying the repetitive signal over network 28 to the egress translator. The egress translator re-generates the repetitive signal responsively to the received repetition indication packet, and provides the repetitive signal to the destination FC device. Using this process, the source and destination FC devices exchange repetitive signals as defined in the FC standard, without having to transport superfluous data over the packet network.

Additionally, since the FC traffic is transported over network 28 using MPLS, the communication path between the ingress and egress translators can use the MPLS traffic engineering (TE) and quality of service (QoS) mechanisms. For example, in MPLS, network resources (e.g., bandwidth of network segments or links) are typically reserved along MPLS tunnel 36 in accordance with a predetermined class of service. Bandwidth requirements may be defined statistically, such as using committed information rate (CIR) and/or peak information rate (PIR) specifications.

Resource reservation in MPLS networks is often performed in accordance with a reservation protocol called RSVP-TE, described by Awduche et al., in IETF RFC 3209 entitled "RSVP-TE: Extensions to RSVP for LSP Tunnels" (December, 2001), which is incorporated herein by reference. RSVP-TE extends the well-known Resource Reservation Protocol (RSVP), allowing the establishment of explicitly-routed LSP using RSVP as a signaling protocol. RSVP itself is described by Braden et al., in IETF RFC 2205, entitled "Resource ReSerVation Protocol. (RSVP)—Version 1 Functional Specification" (September, 1997), which is incorporated herein by reference.

Since the bandwidth that is actually used by a particular tunnel may vary over time, a certain amount of statistical oversubscription is often allowed when reserving network resources to MPLS tunnels. Oversubscription significantly increases the efficient use of network resources. On the other hand, oversubscription means that there is a finite probability of packet loss, when the actually used bandwidth exceeds the reserved bandwidth.

In order to ensure that all FC traffic produced by the source FC device reaches the destination FC device, even though the traffic passes through a communication path having a finite packet loss probability, the methods and systems described herein use selective retransmission and packet rate adaptation. These mechanisms are described in detail below. It should be noted that the methods and systems described herein preserve the original order of the FC traffic produced by the source FC device, as required by the FC standard.

Thus, the methods and systems described herein enable reliable, efficient and transparent transport of FC traffic over packet-switched networks. The system configuration of FIG. 1 is an exemplary configuration, chosen purely for the sake of conceptual clarity. In alternative embodiments, system 20 may comprise any number of FC devices, translators and MPLS tunnels. Each translator may serve one or more FC devices. For example, the methods and systems described herein can be used to interconnect two or more remote FC "islands" using a packet-switched network. Although FIG. 1 shows a point-to-point configuration, the methods and systems described herein can be used in any other FC topology, such as node-to-fabric and fabric-to-fabric connections.

Alternatively to using MPLS, network 28 may use any other suitable communication standard or protocol that provides control over the network resources allocated to the communication path between the translators, such as the asynchronous transfer mode (ATM) protocol.

Figure 2:
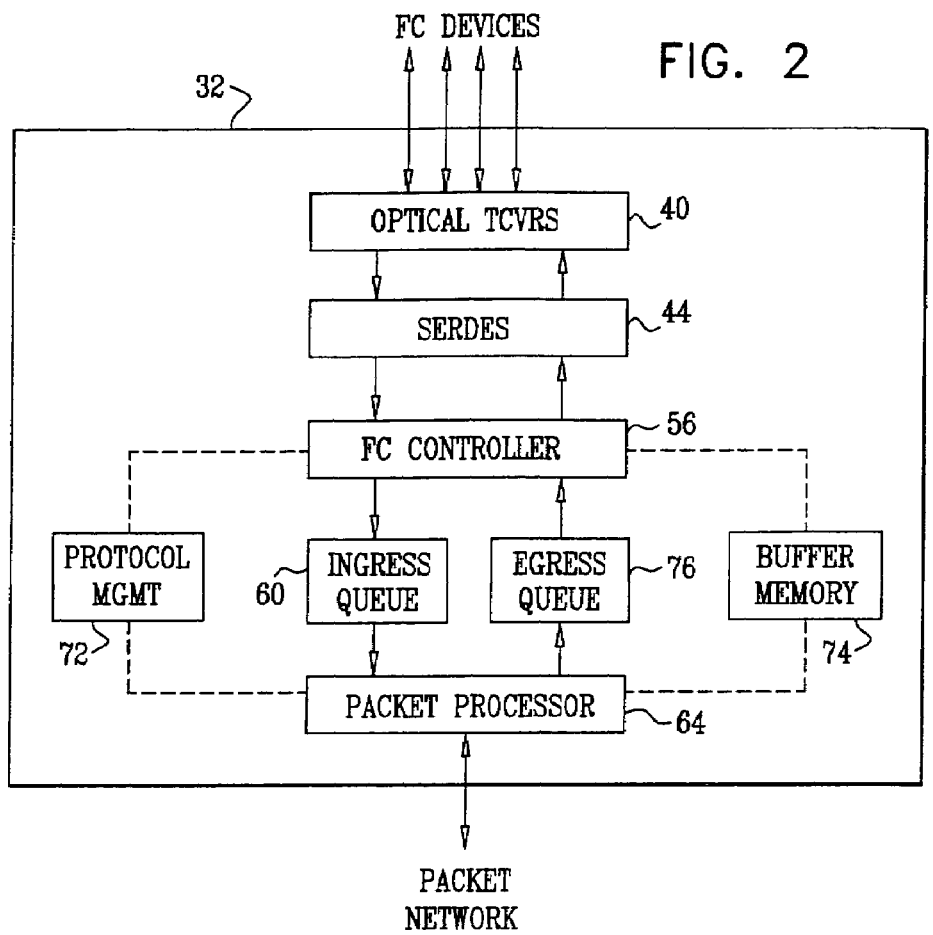
FIG. 2 is a block diagram that schematically illustrates a FC translator, in accordance with an embodiment of the present invention.

FIG. 2 is a block diagram that schematically illustrates FC translator 32, in accordance with an embodiment of the present invention. Translator 32 connects to one or more FC devices via optical fibers and optical transceivers 40. Transceivers 40 convert optical FC signals to electric signals, and vice versa.

In the ingress direction (i.e., from the FC device to the packet network), the high-speed serial electrical signals produced by transceivers 40 are converted to parallel data using a serializer-deserializer (SERDES) 44. A FC controller 56 performs media access control (MAC) functions, such as byte, word and frame synchronization. The FC controller detects and identifies FC primitive signals and other ordered sets (four-byte words used to encode FC data and commands). In particular, FC controller 56 classifies the FC traffic, identifies repetitive signals and suppresses them in order to conserve network bandwidth, as described in FIG. 3 below.

The FC traffic produced by FC controller 56 (which may comprise FC data frames and/or ordered sets) is queued in an ingress queue 60 and provided to a packet processor 64. The packet processor encapsulates the FC traffic in MPLS packets. The MPLS packets are then sent over network 28, to be accepted by a remote egress translator. An exemplary method for ingress processing is described in FIG. 3 below.

A protocol management module 72 controls the transmission of MPLS packets over network 28. Module 72 performs a selective retransmission process, in which lost (dropped) MPLS packets are retransmitted over the packet network. Additionally, module 72 adaptively adjusts the packet transmission rate to ensure a tolerable packet loss probability. Exemplary selective retransmission and packet rate adaptation methods are described in FIG. 7 below.

FC data frames and primitives produced by FC controller 56 are typically numbered with successive sequence numbers and cached in a buffer memory 74, as part of the selective retransmission process. If a particular MPLS data packet is dropped by the packet network, a corresponding cached FC data frame or primitive can be read from memory 74 and retransmitted. The size of buffer memory 74 is typically determined based on factors such as the maximum time window defined for the selective retransmission mechanism, the expected delays over tunnel 36 and/or the expected packet rate.

In the egress direction (i.e., from the packet network to the FC device), MPLS data packets are accepted by packet processor 64. The packet processor decapsulates the MPLS packets to extract the FC traffic. The FC traffic is queued in an egress queue 76 and provided to FC controller 56. The FC controller sends the FC traffic via SERDES 44 and optical transceivers 40 to the locally connected destination FC device. In particular, the FC controller re-generates repetitive signals suppressed by the ingress translator and sends the re-generated signals to the destination FC device. An exemplary method for egress processing is described in FIG. 4 below.

Translator 32 may be implemented using dedicated hardware or firmware, such as in a field-programmable gate array (FPGA) or an application-specific integrated circuit (ASIC). Some functions of the translator, such as, for example, the functions of protocol management module 72, can be implemented using software, or as a combination of hardware and software elements. The translator may be implemented as a standalone provider edge (PE) unit, or as a user interface module (UIM) in a network element (NE) that connects different types of users and services to the packet network.

Figure 3:
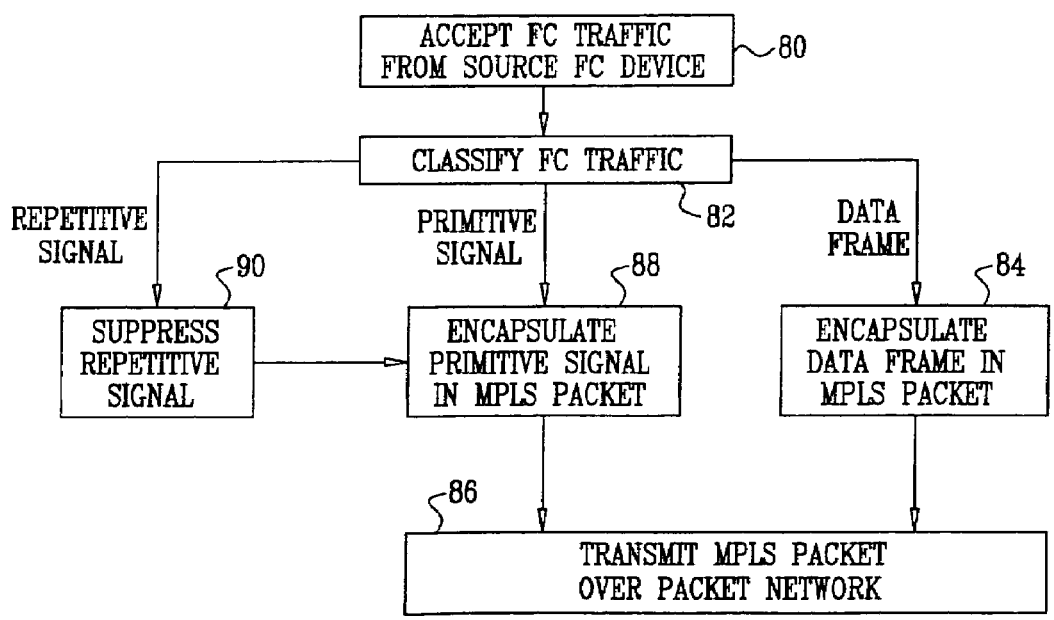
FIGS. 3 and 4 are flow charts that schematically illustrate methods for transporting FC traffic over a packet-switched network, in accordance with an embodiment of the present invention.

FIG. 3 is a flow chart that schematically illustrates a method for ingress processing, in accordance with an embodiment of the present invention. The method is carried out by a FC translator acting as an ingress translator. The method begins with translator 32 accepting FC traffic from a locally connected source FC device, at an ingress input step 80. FC controller 56 of the ingress translator classifies the FC traffic, at an ingress classification step 82. In general, FC traffic may comprise data frames, primitive signals or primitive sequences.

When the FC controller identifies a FC data frame, packet processor 64 of the ingress translator encapsulates the frame in an MPLS data packet, at a data encapsulation step 84. An exemplary FC data frame encapsulated in an MPLS packet is described in FIG. 5 below. The packet processor then sends the MPLS packet via MPLS tunnel 36 to the egress translator, at an ingress transmission step 86.

When the FC controller identifies a FC primitive signal, packet processor 64 of the ingress translator encapsulates the primitive signal in an MPLS data packet, at a primitive signal encapsulation step 88. An exemplary primitive signal encapsulated in an MPLS packet is described in FIG. 6 below. (In some embodiments, IDLE and receiver ready (R_RDY) primitives are processed in a different manner, as will be described further below.) The packet processor then sends the MPLS packet via MPLS tunnel 36 to the egress translator at ingress transmission step 86.

When the FC controller identifies a repetitive signal, it suppresses the repetitive signal, at a suppression step 90. Repetitive signals may comprise, for example, sequences of IDLE frames and other primitive sequences, as described above. Typically, the FC controller considers a particular sequence of frames to be a repetitive sequence when three successive identical primitive signals are identified.

When the FC controller identifies a repetitive signal at step 82 above, it produces a single repetition indication frame that identifies the repetitive signal. The repetition indication frame is encapsulated by packet processor 64 in an MPLS packet, at step 88. The packet is transmitted over network 28 to the egress translator, at step 86. The FC controller of the egress translator subsequently uses the repetition indication frame to re-generate the repetitive signal, as will be described in FIG. 4 below.

In some cases, different repetitive signals may be suppressed in different ways. For example, during the initialization of the FC link, the source and destination FC devices send IDLE sequences to one another. These IDLE sequences are typically replaced by the ingress translator with repetition indication frames, as described above. During normal operation of the FC connection, the source FC device produces sequences of IDLE signals in the IFG, i.e., between successive data frames. In some embodiments, the IDLE sequences in the IFG are suppressed by the ingress translator without transmitting a repetition indication frame. The egress translator automatically generates repetitive IDLE signals in the IFG.

As another example, FC devices exchange R_RDY signals to indicate that the receiver is ready to accept traffic. In some embodiments, the ingress and egress translators terminate the R_RDY signals locally without transmitting them over network 28. The translators count the number of R_RDY signals and use them for buffer and credit management.

Additionally or alternatively, the FC controller may identify particular primitive signals or other ordered sets, and apply special processing to these signals. For example, the FC controller can identify the beginning and end of an FC data frame by identifying start-of-frame (SOF) and end-of-frame (EOF) primitives, as defined in the FC standard.

Figure 4:
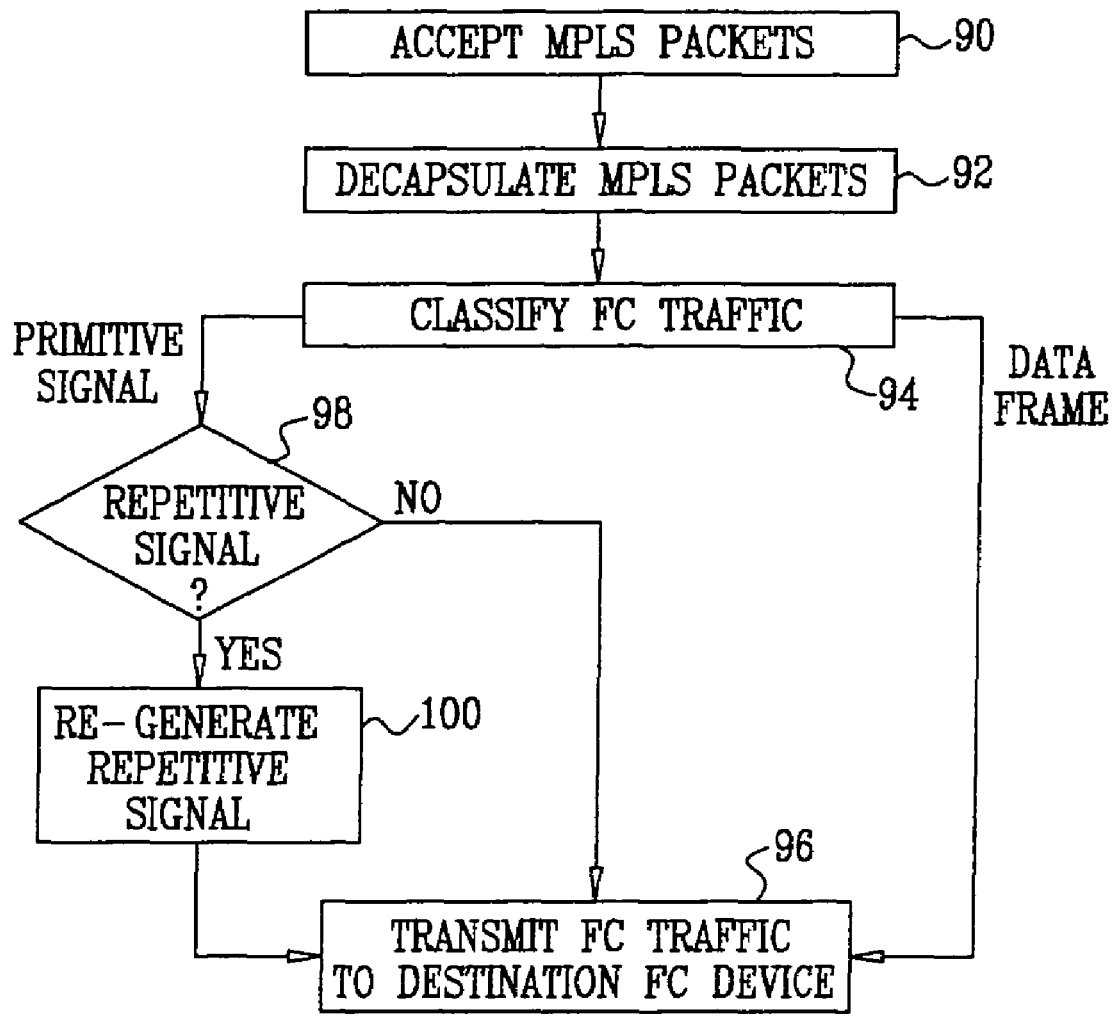

FIG. 4 is a flow chart that schematically illustrates a method for egress processing, in accordance with an embodiment of the present invention. The method is carried out by a FC translator acting as an egress translator. The method begins with translator 32 accepting MPLS packets from MPLS tunnel 36, at an egress input step 90. The MPLS packets comprise encapsulated FC traffic, as described above. Packet processor 64 of the egress translator decapsulates the MPLS packets to extract the FC traffic, at a decapsulation step 92. The FC traffic is provided to FC controller 56 of the egress processor.

The FC controller classifies the FC traffic, at an egress classification step 94. When the FC controller identifies a FC data frame, it transmits the FC data frame to the locally connected destination FC device, at an egress transmission step 96. Otherwise, the FC controller checks whether the classified traffic comprises a repetition indication frame that indicates a repetitive signal, at a repetition checking step 98. If the classified traffic comprises a primitive signal that does not represent a repetitive signal, the FC controller transmits the primitive signal to the destination FC device at step 96 above.

If the classified traffic comprises a repetition indication frame, such as produced by the ingress translator at step 90 of FIG. 3 above, the FC controller of the egress translator re-generates a repetitive signal similar to the suppressed signal, at a re-generation step 100. The FC controller identifies the type of repetitive signal from the repetition indication frame, and produces a corresponding repetitive signal. The re-generated repetitive signal is sent to the destination FC device at step 96. The FC controller of the egress translator typically continues to transmit the repetitive signal until a different FC frame or primitive is identified.

Note that according to the FC standard, the source FC device should login with the destination FC device before exchanging FC traffic. In the login process, the destination FC device provides its address (possibly along with additional operating characteristics of the destination FC device) to the source FC device. The source FC device uses the provided address as the destination address of subsequent FC frames. In some embodiments, the ingress and egress translators encapsulate and transport the signaling frames exchanged between the source and destination FC devices during the login process. The encapsulation and transport are transparent to the FC devices, and the resulting FC connection is an end-to-end non-terminated connection between the source and destination FC devices, which traverses the packet-switched network.

Figure 5:
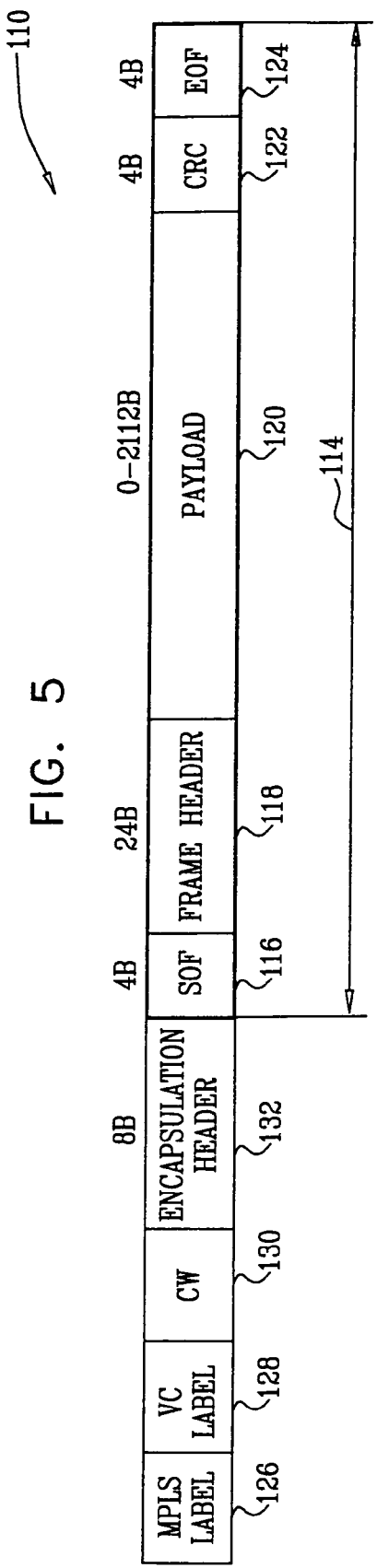
FIG. 5 is a diagram showing an FC data frame encapsulated in a data packet, in accordance with an embodiment of the present invention.

FIG. 5 is a diagram showing an exemplary MPLS data packet 110, which encapsulates a FC data frame 114, in accordance with an embodiment of the present invention. The FC data frame comprises a 4-byte start-of-frame (SOF) delimiter 116, and a 24-byte frame header 118. A payload field 120 carries the data of the FC frame. The payload is typically up to 2112 bytes in size and is made of 4-byte FC words. The payload is followed by a 4-byte cyclic redundancy check (CRC) 122 and a 4-byte end-of-frame (EOF) delimiter.

The MPLS packet that encapsulates the FC data frame comprises an MPLS label 126, a virtual circuit (VC) label 128, a control word (CW) 130 and an 8-byte encapsulation header 132. The control word typically encodes the length of the packet, and may encode a sequence number used for selective retransmission. The encapsulation header may comprise flags that identify the FC frame type (e.g., primitive signal or data frame) and other control information, such as sequence numbers used for selective retransmission.

In some embodiments, the sequence number in CW 130 is not used. Instead, the encapsulation header comprises two different sequence numbers: a sequence number of the current packet and a sequence number indicating the last properly received packet. The egress translator uses these numbers to determine which frames should be retransmitted.

Figure 6:
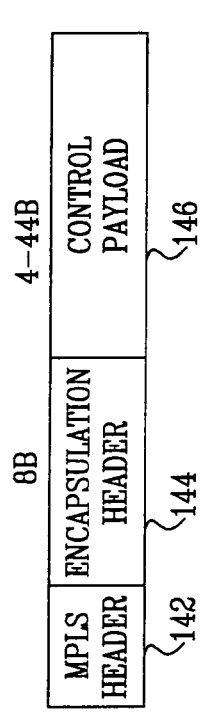
FIG. 6 is a diagram showing FC ordered sets encapsulated in a data packet, in accordance with an embodiment of the present invention.

FIG. 6 is a diagram showing an exemplary MPLS data packet 140, which encapsulates FC ordered sets, in accordance with an embodiment of the present invention. Packet 140 comprises an MPLS header 142, which comprises an MPLS label, VC label and-control word, similar to the respective fields in frame 110 of FIG. 5 above. The MPLS header is followed by an 8-byte encapsulation header 144, similar to encapsulation header 132 of FIG. 5 above. The headers are followed by a control payload 146, which comprises the encapsulated ordered sets, typically up to 44 bytes in size.

Figure 7:
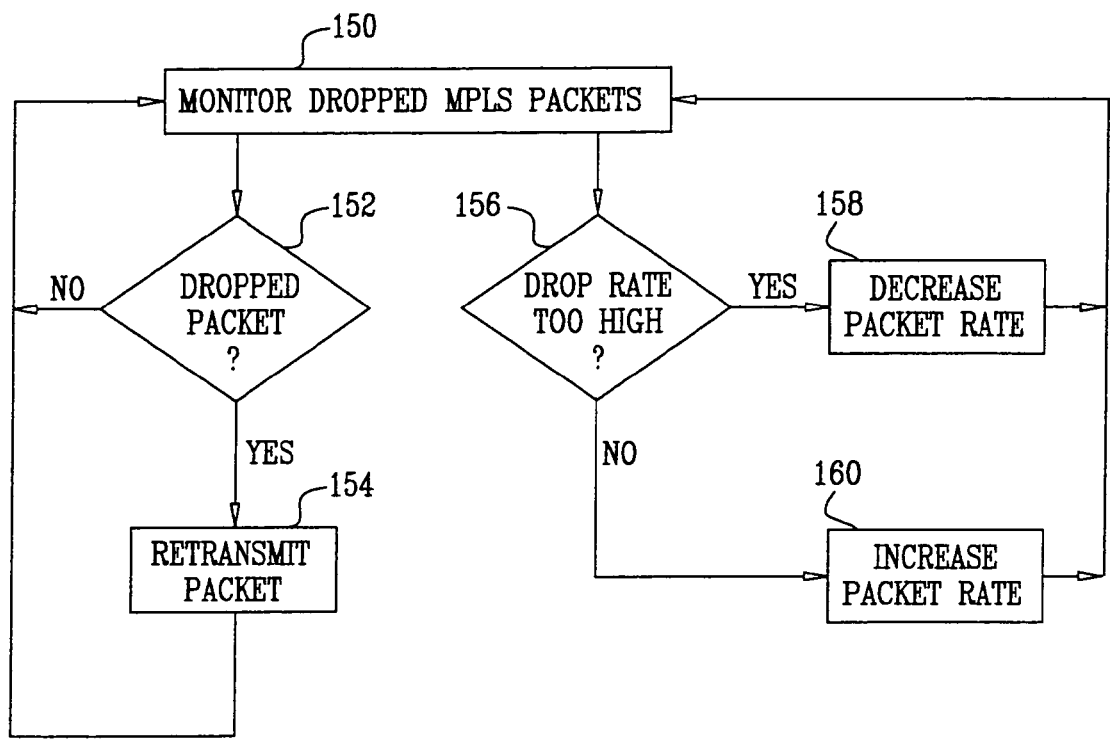
FIG. 7 is a flow chart that schematically illustrates a method for controlling packet transmission over a packet-switched network, in accordance with an embodiment of the present invention.

FIG. 7 is a flow chart that schematically illustrates a method for controlling the packet transmission over network 28, in accordance with an embodiment of the present invention. The method combines two separate processes, a selective retransmission process and a packet rate adaptation process, in order to ensure a reliable transport of MPLS packets via tunnel 36.

The method begins with protocol management module 72 of the egress translator monitoring and detecting lost MPLS packets, at a monitoring step 150. As MPLS packets are accepted by the packet processor of the egress translator, module 72 tracks the sequence numbers in the received packets. Using the sequence numbers, module 72 checks whether packets are missing, at a dropped packet checking step 152. If a packet is found to be missing, the packet is retransmitted, at a retransmission step 154. Module 72 of the egress translator reports (over network 28) the sequence number of the missing packet to the ingress translator. The ingress translator reads the corresponding FC frame or primitive signal from buffer memory 74, encapsulates it in an MPLS packet, and retransmits the packet.

Module 72 of the ingress translator uses the information regarding dropped packets reported by the egress translator to monitor the rate of packet loss at monitoring step 150 above. An exceedingly high packet loss rate typically increases the rate of retransmitted packets, thus increasing the communication and computation overhead and reducing network efficiency. The communication latency may also increase with the higher retransmission rate. Module 72 of the ingress translator controls the packet transmission rate based on the monitored packet loss rate. Typically, module 72 of the ingress translator attempts to maximize the packet transmission rate while minimizing packet loss. In alternative embodiments, the rate adaptation process may adjust the packet transmission rate so as to maintain the packet loss rate within a predetermined range.

If the packet loss rate is higher than a predetermined upper bound, as checked by an upper bound checking step 156, module 72 of the ingress translator reduces the packet transmission rate through tunnel 36, at a rate reduction step 158. If, on the other hand, the packet loss rate is tolerable, module 72 attempts to increase the packet transmission rate, at a rate increasing step 160.

Typically, dropped packets are detected and reported by the egress translator. The ingress translator calculates the dropped packet rate, compares it to the upper bound and performs the appropriate packet transmission rate modifications. In alternative embodiments, these functions can be partitioned differently between the ingress and egress translators.

Although the embodiments described hereinabove mainly refer to storage applications, the methods and systems described herein can be used in any other suitable FC application, such as, for example, resource Sharing (e.g., sharing of disks, tapes, and server computation resources), content sharing (e.g., sharing of database content and media production files), high availability applications (e.g., server interconnect schemes for system resilience), and clustering applications (server interconnect for obtaining increased processing power).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for transporting fibre channel (FC) traffic over a packet-switched communication network, the method comprising:

establishing a FC connection between source and destination FC devices via the packet-switched communication network that is not terminated between the source and destination FC devices by:

accepting login signaling from the source FC device for logging in with the destination FC device;

transporting the login signaling over the packet-switched communication network to the destination FC device;

receiving over the packet-switched communication network an FC address of the destination FC device in response to the login signaling; and delivering the FC address to the source FC device;

identifying a sub-sequence of repetitive FC signals in a sequence of FC words accepted over a FC link from the source FC device;

translating the sequence of the FC words into a sequence of data packets in accordance with a communication protocol supported by the packet-switched communication network, the sequence of the data packets comprising a repetition indication packet that identifies the sub-sequence of repetitive FC signals; and transporting the FC words over the established connection by directing the FC words to the FC address, by transporting the sequence of the data packets over the packet-switched communication network using the communication protocol.

2. The method according to claim 1 and comprising:

receiving the transported data packets from the packet-switched communication network;

reproducing the sequence of the FC words by re-generating the sub-sequence of repetitive FC signals responsively to the repetition indication packet; and providing the reproduced FC words to the destination FC device.

3. The method according to claim 1 wherein transporting the sequence of the data packets comprises identifying and retransmitting a lost data packet.

4. The method according to claim 1 wherein transporting the sequence of the data packets comprises monitoring a packet loss performance of the transported data packets and adjusting a transmission rate of the data packets responsively to the monitored packet loss performance.

5. The method according to claim 1 wherein the destination FC device comprises a storage device, wherein the FC words carry data for storage in the storage device, and wherein transporting the data packets comprises reproducing the sequence of the FC words from the transported data packets, and providing the data to the storage device.

6. The method according to claim 1 wherein the communication protocol comprises a multiprotocol label switching (MPLS) protocol, and wherein transporting the sequence of the data packets comprises sending the data packets via an MPLS label switched path (LSP) established through the packet-switched communication network.

7. The method according to claim 1 wherein the sequence of the FC words comprises FC data frames and ordered sets, and wherein translating the sequence of the FC words into the sequence of the data packets comprises encapsulating at least one of the FC data frames and the ordered sets in accordance with the communication protocol to produce the data packets.

8. The method according to claim 1 wherein translating the sequence of the FC words into the sequence of the data packets comprises sending the repetition indication packet while refraining from sending the sub-sequence of repetitive FC signals over the packet- switched communication network.

9. The method according to claim 1 wherein transporting the FC words comprises at least one of communicating with a shared resource, accessing shared content and communicating with a server in a server cluster.

10. A system for transporting fibre channel (FC) traffic between source and destination FC devices over a packet-switched communication network, comprising:

a first translator, which is arranged to accept a first sequence of FC words from the source FC device, to identify a sub-sequence of repetitive FC signals in the first sequence of FC words, to translate the first sequence of FC words into a second sequence of data packets in accordance with a communication protocol supported by the packet-switched communication network, the second sequence comprising a repetition indication packet that identifies the sub-sequence of repetitive FC signals, and to transport the second sequence of the data packets over the packet-switched network using the communication protocol; and a second translator, which is arranged to receive the transported data packets from the packet-switched communication network, to reproduce the first sequence of FC words by re-generating the sub-sequence of repetitive FC signals responsively to the repetition indication packet, and to provide the reproduced FC words to the destination FC device, wherein the first and second translators are arranged to accept login signaling from the source FC device for logging in with the destination FC device, to transport the login signaling over the packet-switched communication network to the destination FC device, to receive in response to the login signaling over the packet-switched communication network an FC address of the destination FC device, to deliver the FC address to the source FC device so as to establish, via the packet-switched communication network, a FC connection between the source and destination FC devices that is not terminated between the source and destination FC devices.

11. The system according to claim 10, wherein the first translator is arranged to receive a notification identifying a lost data packet, and to retransmit the lost data packet responsively to the notification.

12. The system according to claim 10 wherein the first translator is arranged to adjust a transmission rate of the data packets responsively to a monitored packet loss performance of the transported data packets.

13. The system according to claim 10 wherein the sequence of the FC words comprises data sent for storage in a remote storage device.

14. The system according to claim 10, wherein the communication protocol comprises a multiprotocol label switching (MPLS) protocol, and wherein the first translator is arranged to send the data packets via an MPLS label switched path (LSP) established through the packet-switched communication network.

15. The system according to claim 10, wherein the sequence of the FC words comprises FC data packets and ordered sets, and wherein the first translator is arranged to translate the sequence of the FC words into the sequence of the data packets by encapsulating at least one of the FC data frames and the ordered sets in accordance with the communication protocol to produce the data packets.

* * * * *